United States Patent
Schumacher et al.

(10) Patent No.: US 6,708,477 B2
(45) Date of Patent: Mar. 23, 2004

(54) CROP LIFTER FOR REAPING SYSTEMS OF HARVESTING MACHINES

(75) Inventors: Gustav Schumacher, Eichelhardt (DE); Friedrich-Wilhelm Schumacher, Eichelhardt (DE)

(73) Assignee: Gebr. Schumacher (DE)

( * ) Notice: Subject to any disclaimer, the term of this patent is extended or adjusted under 35 U.S.C. 154(b) by 0 days.

(21) Appl. No.: 10/139,903

(22) Filed: May 7, 2002

(65) Prior Publication Data

US 2002/0166314 A1 Nov. 14, 2002

(51) Int. Cl.⁷ .................. A01D 34/14; A01D 34/18; A01D 34/20
(52) U.S. Cl. ........................... 56/307; 56/298
(58) Field of Search ............... 56/307, 119, 305, 56/298, 313, 312, 318

(56) References Cited

U.S. PATENT DOCUMENTS

| | | | | |
|---|---|---|---|---|
| 1,862,775 | A | * 6/1932 | Thoen | 56/313 |
| 3,579,967 | A | * 5/1971 | Schumacher | 56/313 |
| 3,845,832 | A | 11/1974 | Glover | 180/14 R |
| 4,120,138 | A | 10/1978 | Schumacher, II et al. | |
| 4,295,328 | A | 10/1981 | Schumacher, II et al. | |
| 4,622,840 | A | 11/1986 | Diffenderfer et al. | 72/283 |
| 5,681,222 | A | 10/1997 | Hansen et al. | 464/160 |
| 6,442,919 | B1 | * 9/2002 | Schumacher et al. | 56/307 |

FOREIGN PATENT DOCUMENTS

| | | | | |
|---|---|---|---|---|
| DE | 191691 | | 11/1907 | |
| DE | 1 188 853 | | 3/1965 | |
| DE | 1507366 | | 6/1969 | |
| DE | 25 31 435 | | 2/1977 | |
| DE | 3300769 | | 7/1984 | |
| DE | 43 23 053 | A1 | 1/1995 | |
| DE | 44 45 634 | | 6/1996 | |
| DE | 10113107 | A1 * | 9/2002 | A01D/34/13 |
| GB | 1 396 078 | | 5/1975 | |
| GB | 2376405 | A * | 12/2002 | A01D/65/02 |
| WO | WO 9945758 | A1 * | 9/1999 | A01D/65/02 |

* cited by examiner

*Primary Examiner*—Árpád Fábián Kovács
(74) *Attorney, Agent, or Firm*—Harness, Dickey & Pierce, P.L.C.

(57) ABSTRACT

Harvesting machine reaping systems with crop lifters have a bed plate (1) with projecting reaping fingers (2). A support bar (5) has a first end (8) and a second end (9). The first end (8) attaches on the bed plate (1). The second end (9) of the support bar (5) is connected to a grain lifter (10). A holder (11) is attached on the support bar (5) between the first end (8) and the second end (9). A retainer, for example a pin (17) and pairs of bores, are arranged on the holder (11). The bores are distanced to the support bar (5). The pin (17) is insertable into the bores of one of the pairs of bores. The holder (11), together with the retainer (17), are arranged to form a free motion gap. Thus, the support bar can approach the reaping finger (2) or its tip (16). The support bar (5) is rigidly formed, with respect to flexure, in the area between the second end (9) and the holder (11). The support bar (5) is elastically formed, with respect to flexure, in the area between the holder (11) and the first end (8).

3 Claims, 2 Drawing Sheets

Schnitt II – II

Schnitt III – III

CROP LIFTER FOR REAPING SYSTEMS OF HARVESTING MACHINES

CROSS-REFERENCE TO RELATED APPLICATION

This application claims priority to German Patent Application No. 10123248.9-23, filed May 12, 2001, which application is herein expressly incorporated by reference.

FIELD OF THE INVENTION

The invention relates to a crop lifter for harvesting machine reaping systems which include a bed plate with projecting reaping fingers to which the crop lifters are attached.

BACKGROUND OF THE INVENTION

In known reaping systems, reaping fingers are distributed along the bed plate. The fingers guide a cutter bar and form the counter cutting edge for the cutting edges of the reaping blades attached to the reciprocating cutter bar. In order to reap bent or lying cereals, crop lifters may be used to lift the cereal. These crop lifters include a support bar with its first end retained on the bed plate. Also, the crop lifter is supported, via a holder and holding means attached thereto, at the tip of the reaping finger. The second end of the support bar is connected to a grain lifter. The grain lifter is arranged at an angle to the support bar. The holder holds the crop lifter parallel to the driving direction of the harvesting machine. The support bar is preferably a spring steel. Thus, the crop lifter with its tip, formed by the connection area of the grain lifter with the support bar, can be guided on the ground and follow the ground unevennesses. The holder moves relative to the tip of the reaping finger. The holder itself is riveted to the support bar. Such a crop lifter is described in DE 43 23 053 A1.

Modem reaping systems for harvesting machines, for example combine harvesters, include reaping fingers arranged, in most of the cases, inclined in their working position in a range of 12° to 18° downwards to the ground. The angle achieves a corresponding gap with respect to the ground for the cutting tools tray following in a direction opposite to the movement of the harvesting machine in the reaping operation. Also, the angle enables sufficiently low mowing. The crop lifter support bar in the mounted condition is also inclined to the ground for the same reason.

starting from the tip of the reaping finger. The inclination is changed to a direction of the The inclination towards the ground has to be changed at least support bar parallel to the ground. If the angle is not changed, the crop lifter would contact the ground too steeply and would be pushed into the ground. Thus, the support bar is bent upwards.

The support bars are often bent upwards in the area of or at the holder to achieve a gap between the holder and the gliding portion close to the grain lifter of the support bar. The support bars are then directed downwards up to the gliding portion and thus down to ground contact. Thus, the gliding portion rests on the ground. This gliding portion is formed crosshead shoe-like and the grain lifter is welded to its tip. The crosshead shoe-like portion of the support bar is arched downwards, when seen in cross-section, so that its side edges do not cut into the ground when the crop lifter is loaded sideways when driving around bends.

Such a crop lifter is described in GB-PS 1 396 078. Its support bar is archedly profiled downwards in the gliding portion and upwards in the following portion in the direction towards the holder. The transition from the downwards directed arching to the upwards directed arching is achieved between the portion used as a gliding portion of the support bar and its portion rising towards the holder. However, on the transition there is no reinforcement of the support bar by a profile. Here, the support bar buckles, when the grain lifter is heavily loaded A crop lifter is described in DE-PS 1 188 853. Here the support bar is attached by a holder above a reaping finger. The support bar is not provided with a profile in its gliding portion. Only its portion steeply rising to the holder is provided with a profile. The support bar has, because of this, spring characteristics only in the gliding portion parallel to the ground.

A crop lifter is described in DE-OS 25 31 435. Here the support bar is provided with a profile archedly downwards or upwards in the area of the holder. The support bar is not provided with a profile from the grain lifter attachment area to the holder.

These known crop lifters have several disadvantages. For example, when the grain lifter is loaded by strong crops, the support bar is elastically deflected in a buckling way straight away behind the gliding portion. In the embodiment according to DE-PS 1 188 853 the support bar deflects generally in the middle of the gliding portion. This leads to the tip of the crop lifter bending upwards. Thus, grain lodged in the crop lifter exits from the crop to be harvested. Accordingly, when an individual crop lifter bends upwards, the neighboring crop lifter, however, does not bend. Thus, the straw of the one crop lifter is pressed downwards and the straw of the neighboring crop lifter is pressed upwards. This straw build-up cannot be transported anymore to the back of the harvester and leads to a blockage of the cutter bar. The driver must reverse the machine, to remove the straw build-up from the cutter bar.

SUMMARY OF THE INVENTION

The present invention provides a crop lifter with the end of the support bar, close to the attachment area of the grain lifter, even under stronger loading of the grain lifter, remains approximately constant in its orientation to the ground.

The harvesting machine reaping system has a bed plate with projectingly attached reaping fingers to which a crop lifter is attached. A support bar has a first end and a second end. The first end serves to retain the support bar on the bed plate. A grain lifter is connected to the second end of the support bar. A holder is attached on the support bar between the first end and the second end. Retaining means is attached to the holder. The retaining means is arranged at a distance to the support bar and is supportable on the reaping finger. The holder, together with the retaining means defines a free motion gap. The gap enables an approximation of the support bar to the reaping finger.

The support bar is formed with a rigid flexure in an area between the second end and the holder. Also, the support bar is formed with an elastic flexure in an area between the holder and the first end.

Springing of the support bar is extremely limitedly or completely eliminated in the area between the end of the support bar, attached to the grain lifter, and the holder. If the gliding portion of the support bar of the crop lifter is pushed upwards by a ground elevation, the support bar does not spring upwards directly behind the grain lifter. Also, there is very limited springing in the area between the gliding portion and the holder. However, the springing area is displaced behind the holder to the area between the holder and the first end of the support bar. Vertical movement is provided vertically in the holder relative to the tip of the reaping finger. This movement enables the tip of the crop lifter to be lifted upwards up to 10 cm relative to the tip of the reaping finger. Accordingly, the tip can avoid, due to the movement, ground elevations. The further the spring elastic bending is displaced backwards of the first end, the less the inclination angle of the tip of the crop lifter changes with reference to the reaping finger. The gliding portion of the support bar of the crop lifter remains in contact to the ground over a longer portion. Thus, wear is reduced. This portion when loaded is also not guided out off the crop to be harvested. The support bar is also more stable in this area due to a more or less strong contoured profile corresponding to the requirements for a rigid formation. Thus, a weaker raw material can be used which leads to a reduction of cost.

In an embodiment of the invention, the support bar is formed with a rigid flexure, by a contour in the area between the second end and the holder. This refers especially to the area which follows the area of the attachment of the grain lifter on the support bar starting from the second end of the support bar in the direction towards the holder. The immediate area at the second end is already sufficiently reinforced by the attachment of the grain lifter on the support bar. Thus, the provision of a profile or contour is applied in the crosshead shoe-like area. The support bar crosshead shoe-like area abuts the ground and extends to the holder.

The elastic flexure design for the portion between the holder and the first end means that a deflection of this portion takes place when the grain lifter is loaded in a way which exceeds the normal loading during the normal reaping on a level surface. In this case, the support bar should move closer to the reaping finger within the gap of free motion in the holder. Preferably, the support bar is arched in the portion from the second end or the attachment area of the grain lifter on the support bar up to the holder.

BRIEF DESCRIPTION OF THE DRAWINGS

A preferred embodiment of the invention is represented schematically in the drawing.

DETAILED DESCRIPTION OF THE PREFERRED EMBODIMENTS

Figure 1:
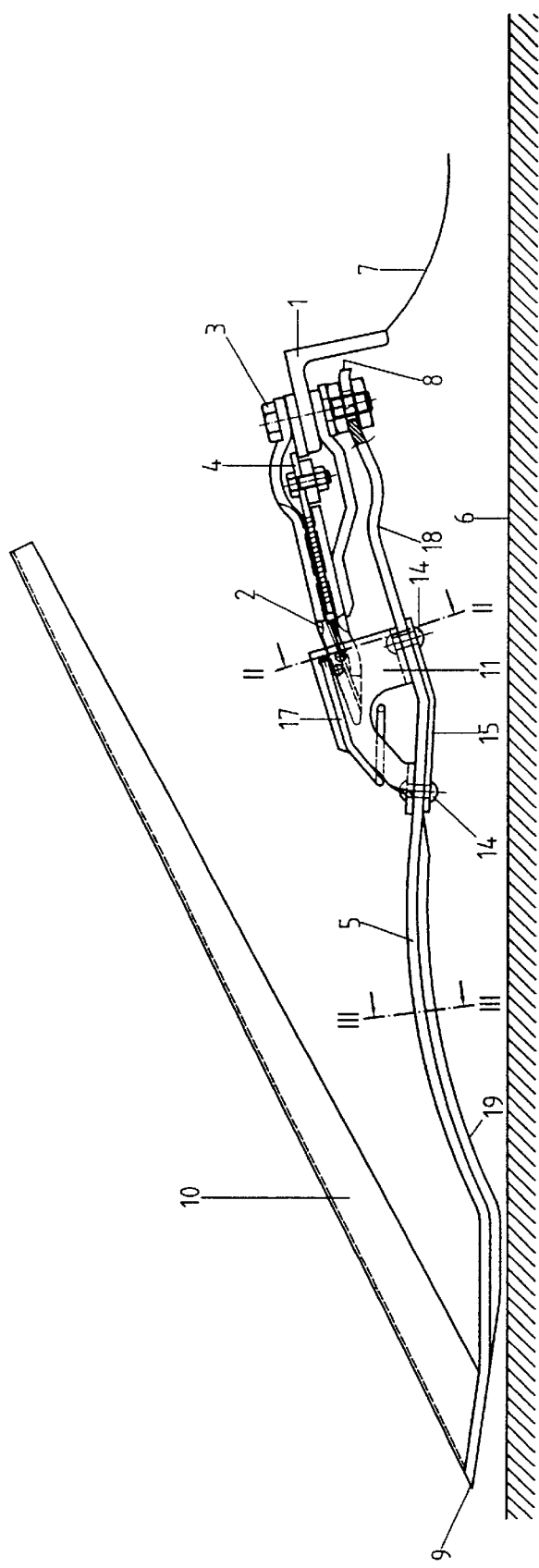
FIG. 1 shows a side view of a crop lifter attached on a bed plate and reaping finger of a reaping system of a harvesting machine.

In FIG. 1 a bed plate 1 is visible in a schematically representation. A reaping finger 2 projects from the bed plate 1. The reaping finger 2 is mounted, via a screw 3, on the bed plate 1. Further reaping fingers are arranged on the bed plate 1 with a distance between each other when viewed into the drawing plane or projecting therefrom.

The reaping fingers 2 guide a cutter bar 4. The cutter bar 4 has reaping blades to cut the crop to be harvested. The reaping finger 2 is inclined at an angle of around 18° with its tip to the ground 6. The reaping table may be lowered to allow cutting as low as possible, without lowering the reaping table so far that the cutting tools tray 7 abuts the ground 6.

The first end 8 of a support bar 5 is made from a flat material. The first end 8 is attached on the bed plate 1 via a fork-like formation. A washer with an annular groove, attached via the screw 3, secures the first end on the bed plate 1. The second end 9 of the support bar is distanced from the first end 8. A grain lifter 10 is attached on the support bar 5 at the second end 9. The grain lifter 10 extends at an angle to the support bar 5 and rises in the direction towards the bed plate 1.

Figure 2:
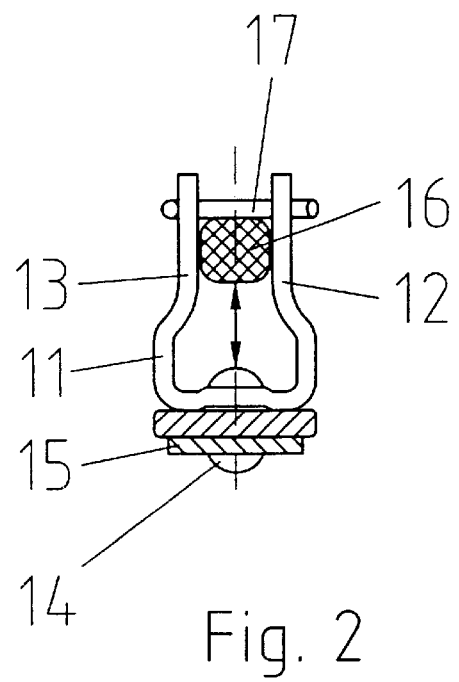
FIG. 2 is an enlarged sectional view of FIG. 1 along Line II—II thereof.

The support bar 5 is supported by a holder 11 on the reaping finger 2 or on its upper face facing away from the support bar 5. As visible from FIG. 2, the holder 11 has two parallel extending legs 12, 13. The legs 12, 13 are connected to each other. A reinforcement plate 15 abuts the face of the support bar 5 facing away from the grain lifter 10. The reinforcement plate 15 is connected together with the holder 11 by rivets 14 to the support bar 5. The reaping finger tip 16 of the reaping finger 2 is received between the two legs 12 and 13. Bores, are arranged in the two legs 12, 13 in pairs with constant distance to the grain lifter-sided face. Thus, the bores enable the holder 11 to achieve different settings which, in turn, enable different settings of the support bar 5 to the reaping finger 2. A pin 17 is inserted through the pair of bores. The pin 17 is supported on the upper face of the reaping finger 2 distanced from the support bar 5. The reaping finger tip 16 is guided between the two legs 12, 13. The reaping finger tip 16 carries out a relative movement towards the support bar 5, as represented by the double arrow of FIG. 2. Thus, a springing movement of the support bar 5, as following described, is possible at ground unevennesses.

The attachment-sided portion of the support bar 5, between the holder 11 and the first end 8, is designated by the reference numeral 18. This attachment-sided portion 18 is elastic with respect to flexure. Thus, when higher forces act on the grain lifter, this portion 18 deforms. The attachment-sided portion 18 of the support bar 5 towards the first end 8 in the area of the screw 3 is clamped. In the area of the holder 11 the support bar 5 comes closer to the reaping finger 2.

Figure 3:
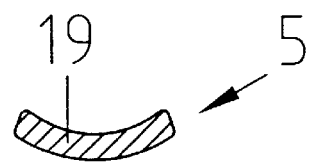
FIG. 3 is an enlarged sectional view of FIG. 1 along Line III—III thereof.

The grain lifter-sided portion 19 of the support bar 5 is rigid with respect to flexure. When loadings are produced which lead to an elastic bending of the attachment-sided portion 18, this grain lifter-sided portion 19 experiences no or only an insignificant deformation. Sufficient rigidity is achieved in the area of the second end 9 via attachment of the grain lifter 10 on the support bar 5. The area of the support bar following this attachment up to the holder 11, as can be seen from FIG. 3, is arched, to achieve the necessary rigidity. This arching extends over the guided crosshead shoe-like portion from the ground 6, up to the area extending from the ground to the holder 11.

While the above detailed description describes the preferred embodiment of the present invention, the invention is susceptible to modification, variation, and alteration without deviating from the scope and fair meaning of the subjoined claims.

What is claimed is:

1. A crop lifter for reaping systems of harvesting machines, having a bed plate with projectingly attached reaping fingers, comprising:

a support bar with a first end and a second end, said first end adapted for retaining on the bed plate;

a grain lifter is connected to the second end of the support bar;

a holder being attached on the support bar between the first end and the second end;

retaining means being attached to the holder, said retaining means spaced from the support bar and said retaining means supporting the reaping finger, said holder together with the retaining means defining a free motion gap, said gap enabling movement of said reaping fingers between said retaining means and the support bar; and said support bar being rigid, with respect to flexure, in an area between the second end and the holder and said support bar being elastic, with respect to flexure, in an area between the holder and the first end accordingly flexure of the support bar in the area between the second end and the holder is substantially eliminated enabling the crop lifter to maintain contact of a gliding portion of the support bar to the ground.

2. The crop lifter according to claim 1, wherein the support bar is rigidly formed with respect flexure, in an area between the second end and the holder by means of a desired cross-sectional shape of the support bar.

3. The crop lifter according to claim 2, wherein the support bar is arched, when seen in cross-section, from the second end up to the holder.

* * * * *

UNITED STATES PATENT AND TRADEMARK OFFICE
CERTIFICATE OF CORRECTION

PATENT NO. : 6,708,477 B2
DATED : March 23, 2004
INVENTOR(S) : Schumacher et al.

It is certified that error appears in the above-identified patent and that said Letters Patent is hereby corrected as shown below:

Column 1,
Line 37, "Modem" should be -- Modern --
Lines 48-53, "[0005) starting from the tip of the reaping finger. The inclination is changed to a direction of The inclination towards the grouns has to be changed at least support bar parallel to the ground. If the angle is not changed, the crop lifter would contact the ground too steeply and would be pushed into the ground. Thus, the support bar is bent upwards." should be -- [0005] The inclination towards the ground has to be changed at least starting from the tip of the reaping finger. The inclination is changed to a direction of the support bar parallel to the ground. If the angle is not changed, the crop lifter would contact the ground too steeply and would be pushed into the ground. Thus, the support bar is bent upwards. --

Signed and Sealed this

Thirty-first Day of August, 2004

JON W. DUDAS
*Director of the United States Patent and Trademark Office*